Dec. 30, 1952     J. C. BUECHEL     2,623,610
AIR INLET SCREEN FOR GAS TURBINES
Filed Oct. 25, 1949
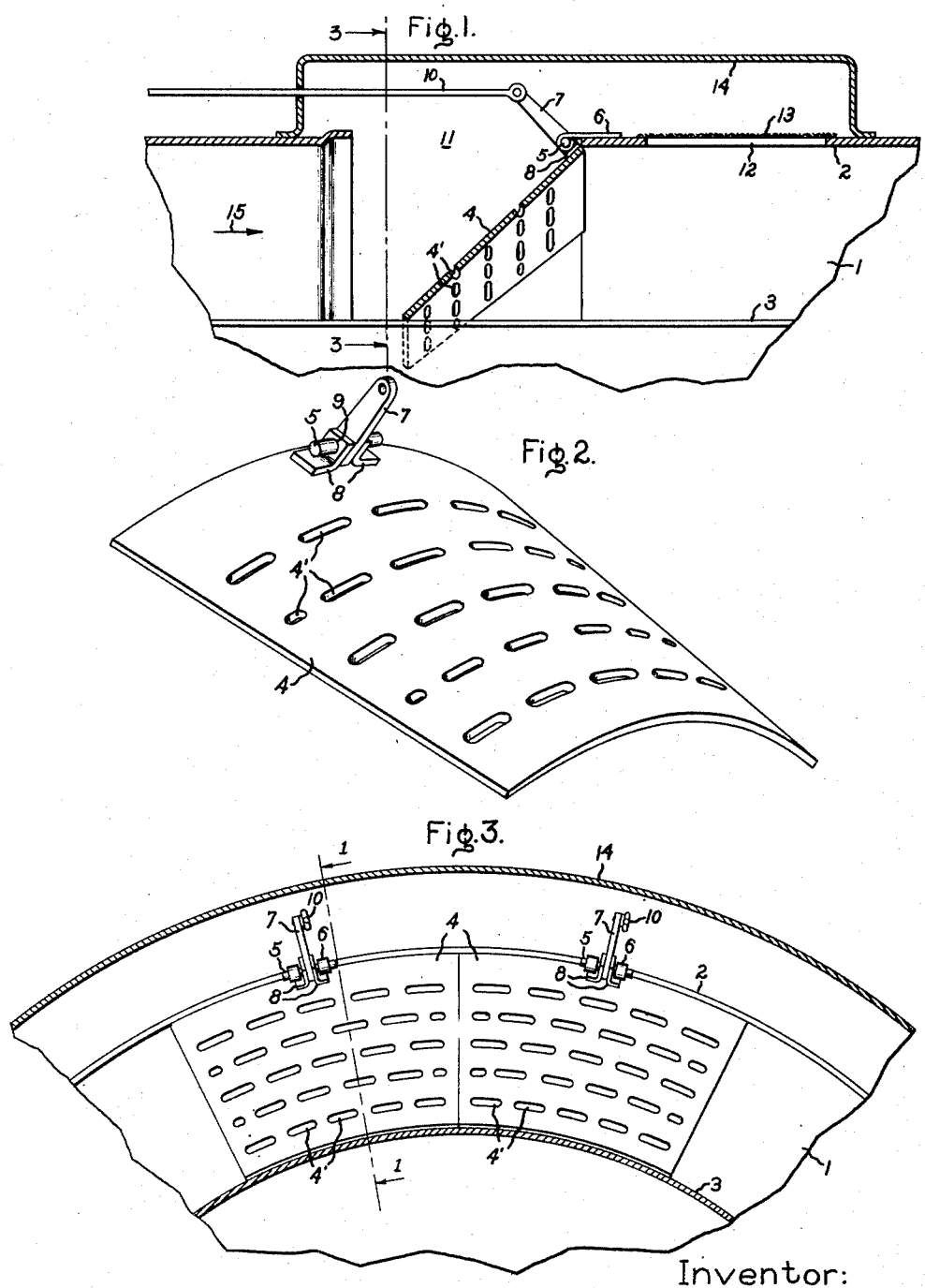
Inventor:
Joseph C. Buechel,
by *Ernest H. Britton*
His Attorney.

Patented Dec. 30, 1952

2,623,610

UNITED STATES PATENT OFFICE 2,623,610

AIR INLET SCREEN FOR GAS TURBINES

Joseph C. Buechel, Wakefield, Mass., assignor to General Electric Company, a corporation of New York Application October 25, 1949, Serial No. 123,322

2 Claims. (Cl. 183—62)

This invention relates to fluid energy converting apparatus and particularly to retractable means for preventing foreign particles from entering such apparatus.

It has been customary to provide a grille or screen or other protective device in the inlet passage of gas turbine powerplants to prevent pebbles or other foreign objects from passing through the powerplant during operation and therefore causing great damage. The provision of such a grille or screen is made at the expense of output and efficiency of the powerplant, since a definite pressure drop must exist across the protective device. Tests have shown that this pressure drop may amount to as much as one pound per square inch which adversely effects the output of the powerplant as much as seven percent. If the powerplant is intended for operation under atmospheric icing conditions as in aircraft service at high altitudes, experience has shown that ice tends to accumulate on the protective device which not only results in an increased pressure drop and thus adversely effects the output of the powerplant, but in addition may accumulate to such an extent that it blocks or partially blocks the inlet passage. When this occurs, the temperature level at which the turbine operates is rapidly increased. In general, the output of a gas turbine power plant increases with increasing turbine temperature while the life of certain structural elements decreases. Accordingly, it is desirable to operate such powerplants at the highest turbine temperature level which is consistent with the desired life expectancy of the critical structural elements. Thus it will be apparent that if an icing condition occurs the powerplant performance may be adversely affected and, the turbine temperature level may rapidly rise to an unsafe value so that premature deterioration and perhaps even failure of the critical structural elements can be expected. One type of apparatus for overcoming difficulties of the type described is described in a co-pending application of Daniel Q. Marshall, S. N. 123,382, filed October 25, 1949, now Patent 2,534,138, and assigned to the assignee of the present application.

In addition to the difficulties described above, there is a problem of providing a protective device with sufficient strength to withstand the impact forces resulting from foreign objects striking the device at high velocity. Furthermore, if a retractable protective device such as that described in the above mentioned Marshall application is employed, it is important to provide means for disposing of foreign particles which may become lodged in the protective device in such a way that the particles are prevented from falling into the inlet passage to the powerplant when the protective device is retracted.

Accordingly, it is an object of the invention to provide novel and improved apparatus for obviating the above-mentioned difficulties.

Another object is to provide protection to the powerplant against the entry of foreign objects and for minimizing the pressure drop in the inlet passage during periods when such protection is not required.

Still another object is in the provision of a retractable protective device of sufficient strength to withstand impact of foreign objects at high velocity and in the provision of means for preventing trapped foreign objects from entering the powerplant upon retraction of the protective device.

A further object is in the provision of means for preventing ice accumulation on the protective device.

Other objects and advantages will be apparent when the following description taken in connection with the accompanying drawings, in which Fig. 1 is a sectional view looking in the direction of arrows 1—1 of Figure 3 of a portion of an inlet passage of a gas turbine powerplant illustrating a protective device in accordance with the invention; Fig. 2 is a perspective view of a retractable flap segment; and Fig. 3 is a view looking in the direction of arrows 3—3 into a portion of the inlet passage of Fig. 1 showing two adjacent flap segments in the closed position.

Referring now to Fig. 1, atmospheric air is drawn into a gas turbine type of powerplant through an annular inlet passage 1 formed by spaced walls 2, 3. The structural details of the powerplant are not essential to an understanding of the present invention and therefore are not shown. The features of construction of such power plants are described with particularity in U. S. Patent 2,432,359, Streid, and in copending applications of Alan Howard, Serial Number 506,930, filed October 20, 1943, now Patent 2,479,573, and Serial Number 541,565, filed June 22, 1944, and assigned to the assignee of the present application. A plurality of flap segments 4 are pivoted to wall 2 by a pivot 5 supported by a pivot supporting member 6 which in turn is secured to wall 2 by welding, riveting, or any other desired and convenient securing means. As illustrated in the drawings, flap segments 4 are arcuate metal segments formed to blend with the inlet passage and thereby can be made of sufficient thickness to withstand the entire force arising from the impingement therein of foreign articles of a predetermined size and at a predetermined velocity. To permit a partial flow of air through the flap and into passage 1, a plurality of openings 4' is provided. The size, shape and exact number of openings is not critical, but the openings are provided with a characteristic dimension which is less than the corresponding dimension of the foreign object against which protection is desired. In general, a rather large number of openings will be provided so that a portion of the required flow of air can pass through the flap openings 4' with minimum pressure drop; but at the same time sufficient space must be left between openings so that the strength and rigidity of flap 4 can withstand the impact of foreign objects which may try to enter passage 1. The remaining airflow enters the engine by passing through the manifold 14 and secondary screen 13. A lever 7 and supporting clips 8 are suitably secured to flap 4 for effecting positional changes thereof. An opening 9 is provided in supporting clips 8 for receiving pivot 5. Lever 7 is flexibly connected to a rod 10, which in turn is connected to suitable actuating means for effecting axial movements of rod 10. The actuating means forms no part of the present invention and is therefore not shown.

It is not only desirable but important that means are provided for the safe disposal of foreign objects which may become lodged against flap 4. This is accomplished in accordance with the invention by the provision of a manifold in parallel flow relation with inlet passage 1. Openings 11, 12 are provided at the upstream and downstream sides, respectively, of pivot 5, and opening 11 is made of substantially the same shape as the periphery of flap 4 so that opening 11 is effectively closed when flap 4 is in the retracted position except for openings 4'. A mesh screen secured to wall 2 covers opening 12. A third wall 14 enclosing openings 11, 12 and spaced from wall 2, forms a manifold in parallel flow relation with the inlet passage 1.

During operation of the powerplant at all near ground level, rod 10 is moved to the left so that flap segments 4 assume the position indicated in Figs. 1 and 3. The flow of air to the powerplant is from left to right in the drawing as indicated by arrow 15. The major portion of the air flows first through openings 4' and then to the powerplant through passage 1. The remaining portion flows through screen 13 and opening 12 to passage 1. Since openings 4' are smaller than the size of the foreign objects as previously indicated, such objects will be deflected to the manifold or space between walls 2 and 14, or will remain lodged against the surface of flap segments 4 and therefore are prevented from entering the powerplant.

Where protection from foreign objects is not required or where there may be a tendency for ice particles to accumulate on the exposed surface of flap segments 4 in the non-retracted position, rod 10 is moved to the right thereby causing flap segment 4 to rotate about pivot 5 until the flap is substantially out of inlet passage 1. As indicated in Fig. 1, the free end of flap segment 4 is at all times at a location upstream from pivot 5. Therefore, any foreign particles which may become lodged against the flap 4 or in openings 4', while the flap is in the position shown in Fig. 1, will tend to be retained therein during retraction and are eventually blown into the manifold space between walls 2 and 14. Such particles are of course prevented from re-entering passage 1 by screen 13.

Thus it will be seen that the invention provides protection to the powerplant against damage by preventing entry of foreign objects during periods when such protection is needed, and provides means for removal of such protection so as to minimize pressure drop during periods when protection is not needed, as well as minimizing the tendency for ice to accumulate in the inlet passage during such periods. If the flap should fail to retract under an icing condition the system would function as an inertia separator with the air entering the powerplant through the secondary screen path.

While a particular embodiment of the invention has been illustrated and described, it will be obvious to those familiar with the art that various changes and modifications may be made without departing from the invention, and it is intended to cover in the appended claims all such changes and modifications that come within the true spirit and scope of the invention.

What I claim as new and desire to secure by Letters Patent of the United States is:

1. In a fluid energy converting apparatus including means defining an annular inlet passageway, walls spaced from the outer circumferential surface of said passageway and forming therewith a second coaxial annular passageway, a plurality of wall segments adapted conjointly to form a conoidal structure for disposition within and extending across said inlet passageway in a fluid screening position and having a plurality of openings therein, means at said outer circumferential surface for pivotally supporting said segments, means including a screen at a location downstream from said pivotal supporting means and at said circumferential surface establishing communication between the second passageway and the inlet passageway, means including a plurality of openings at a location upstream from said pivotal supporting means establishing communication between the inlet passageway and the second passageway, and means for moving said wall segments away from said screening position.

2. In a gas turbine powerplant including means defining an annular air inlet passageway, walls spaced from the outer circumferential surface of said passageway and forming therewith a second coaxial annular passageway, a plurality of rigid wall segments adapted conjointly to form a conoidal structure for disposition within and extending across said inlet passageway in an air screening position and having a plurality of openings therein, means at said outer circumferential surface for pivotally supporting said segments, means including a screen at a location downstream from said pivotal supporting means and at said circumferential surface establishing communication between the second passageway and the inlet passageway, said pivotal supporting means being spaced downstream from the edge portions of the wall segments which are adjacent the inner circumferential surface of said inlet passageway in the air screening position, means including a plurality of openings at a location upstream from said pivotal supporting means for establishing communication between the inlet passageway and the second passageway, said last-mentioned openings being equal in number to the number of said wall segments and being substantially of the same shape as and slightly smaller than said wall segments, and means for moving said wall segments about said pivotal supporting means from the air screening position to a position substantially parallel to and adjacent said outer circumferential surface whereby said last-mentioned openings are substantially covered by said wall segments in the latter position.

JOSEPH C. BUECHEL.

REFERENCES CITED

The following references are of record in the file of this patent:

UNITED STATES PATENTS

| Number | Name | Date |
| --- | --- | --- |
| 2,319,894 | Vokes | May 25, 1943 |
| 2,381,705 | Vokes | Aug. 7, 1945 |
| 2,407,194 | Vokes | Sept. 3, 1946 |
| 2,534,138 | Marshall | Dec. 12, 1950 |
| 2,546,153 | De Remer | Mar. 27, 1951 |
| 2,555,592 | Kelly | June 5, 1951 |

FOREIGN PATENTS

| Number | Country | Date |
| --- | --- | --- |
| 565,587 | Great Britain | Nov. 16, 1944 |